United States Patent [19]

Assaf

[11] Patent Number: 4,475,535
[45] Date of Patent: Oct. 9, 1984

[54] SEGREGATED SOLAR POND

[75] Inventor: Gad Assaf, Rehovot, Israel
[73] Assignee: Solmat Systems, Ltd., Yavne, Israel
[21] Appl. No.: 134,659
[22] Filed: Mar. 27, 1980
[51] Int. Cl.³ .............................................. F24J 3/02
[52] U.S. Cl. .................................. 126/415; 126/430; 126/437; 126/452; 165/1; 165/45; 60/641.8; 60/641.13
[58] Field of Search .............. 126/415, 452, 417, 430, 126/437, 900; 165/1, 104 S, 45; 60/641 G, 641 B, 641 A, 641 AD, 641.8, 641.9, 641.13; 203/DIG. 1, DIG. 17; 159/1 S, 18 F

[56] References Cited

U.S. PATENT DOCUMENTS 3,372,691 3/1968 Shachar ................................. 165/1
3,949,095 4/1976 Pelehach et al. ............... 126/426 X
4,172,766 10/1979 Laing et al. ..................... 126/424 X

OTHER PUBLICATIONS

"The Dead Sea: A Scheme For a Solar Lake," Assaf, Solar Energy, vol. 18, pp. 293–299, (1976).

Primary Examiner—Larry Jones
Attorney, Agent, or Firm—Sandler & Greenblum

[57] ABSTRACT

A segregated solar pond includes an upper level of water overlying a lower level of water, and an impermeable barrier interposed between the two levels for preventing intermixing. The average density of the upper level exceeds the average density of the upper level. Floats on the periphery of the upper level buoyantly support it on the surface of a larger body of water connected to the lower level. The upper level contains dissolved salts establishing a halocline that renders the upper level non-convective such that it is heated by absorption of solar radiation, the heat being transferred to the lower level by conduction across the barrier. Vertical curtains attached to the periphery of the barrier inhibit mixing of the water in the lower level with the water in the larger body of water such that the lower level constitutes a heat storage layer.

The barrier between the two layers includes a sheet of flexible material and a frame supporting the same rigidly connected to the floats. The upper level is stabilized by additional floats rigidly connected to the frames and floating in the upper level.

43 Claims, 11 Drawing Figures

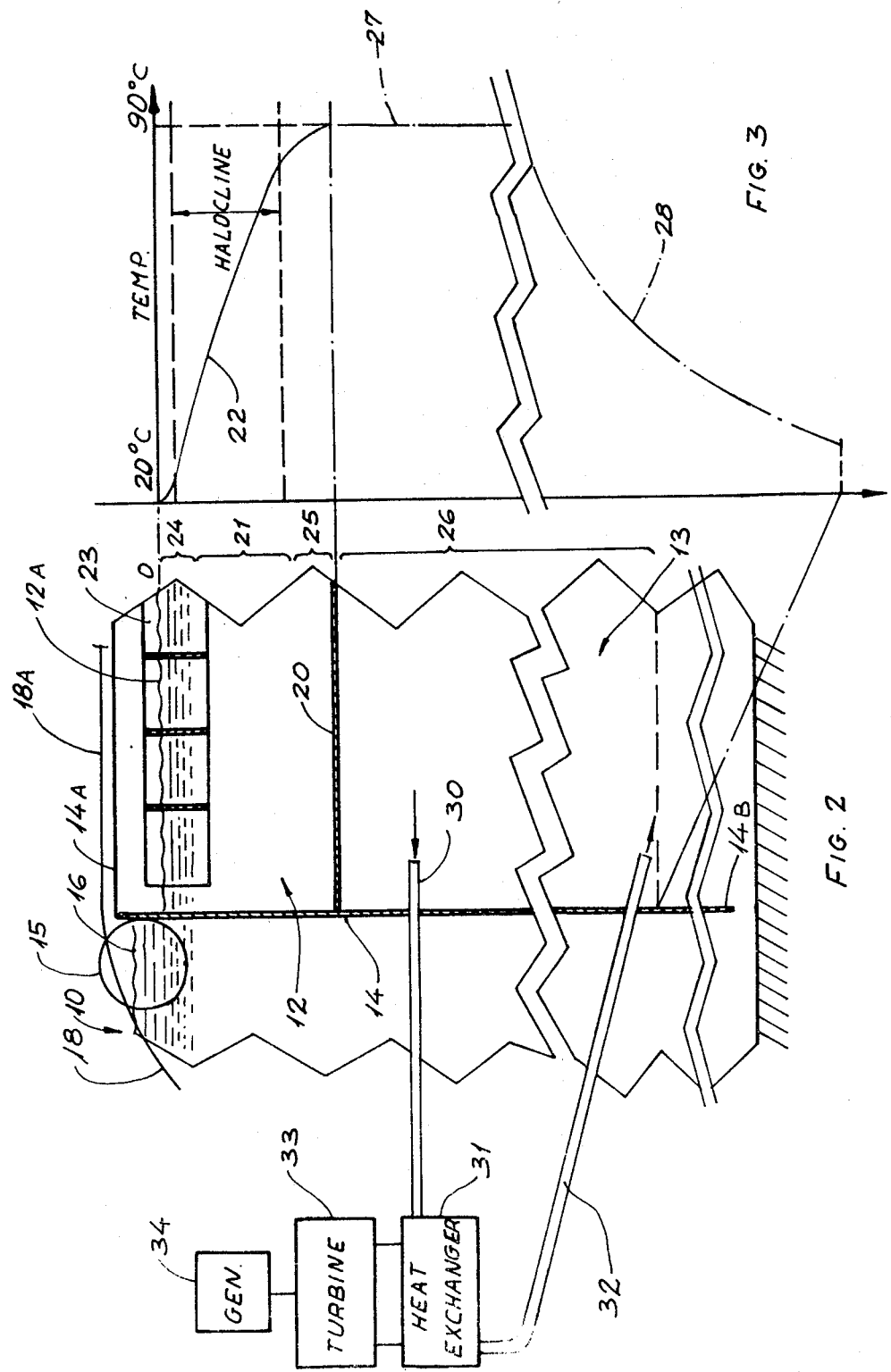

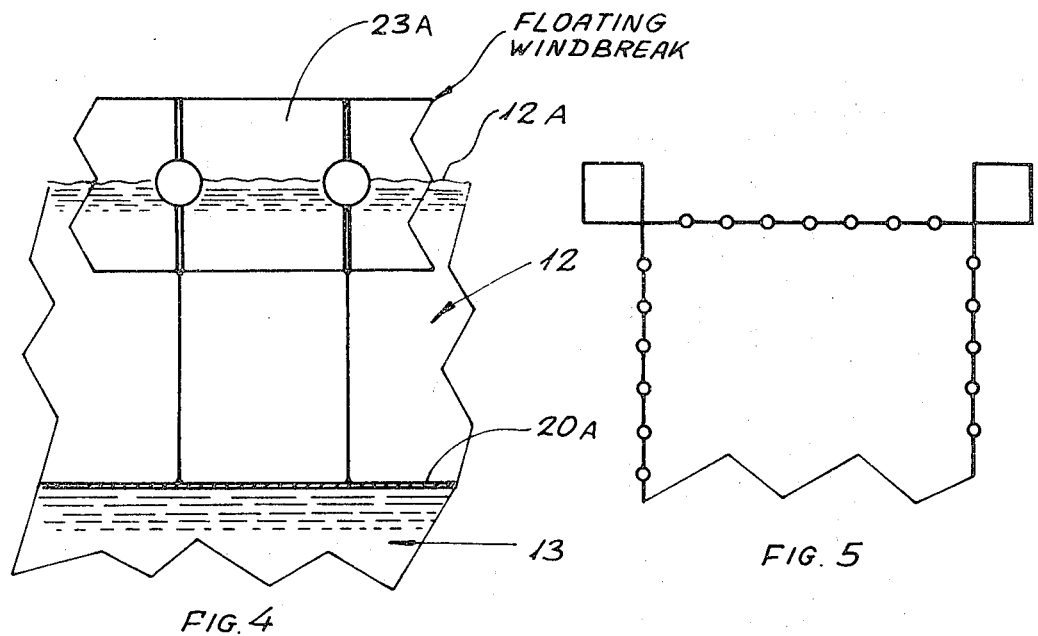
FIG. 4
FIG. 5
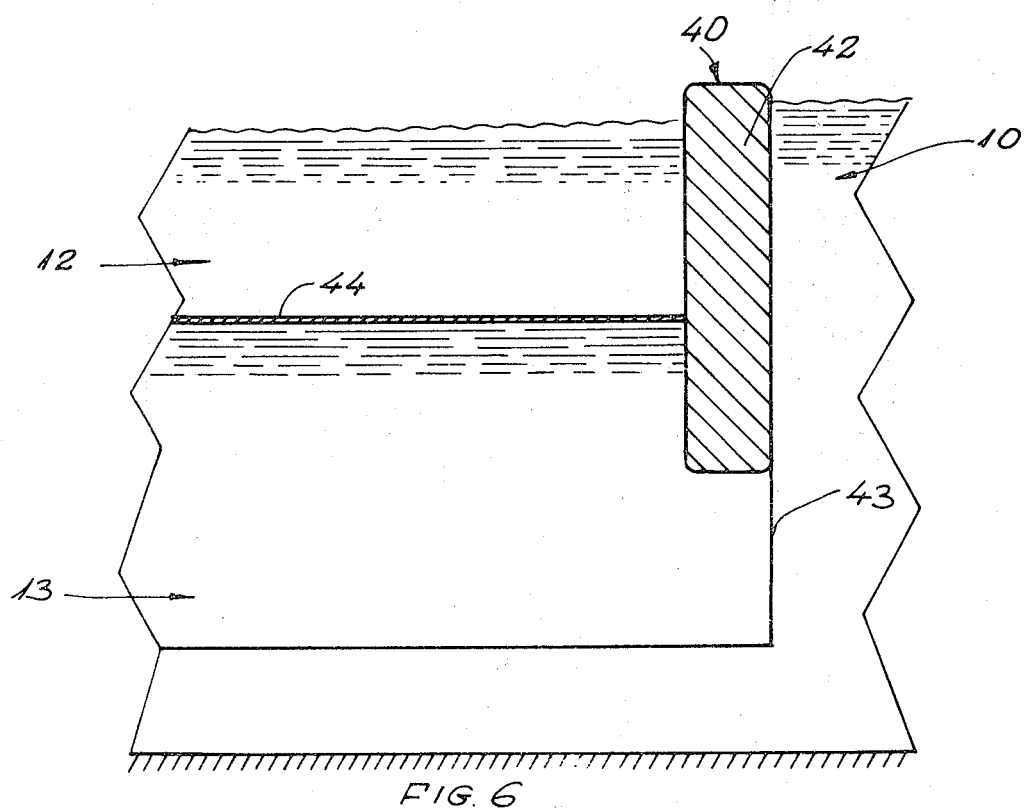
FIG. 6

SEGREGATED SOLAR POND

CROSS REFERENCES TO RELATED SUBJECT MATTER

The following references supplementing this disclosure are hereby incorporated by reference:
[1] Israeli Pat. No. 12,561 of May 25, 1959;
[2] U.S. Pat. No. 3,372,691;
[3] "The Dead Sea; A Scheme for a Solar Lake" by Gad Assaf, *Solar Energy*, Volume 18, pp. 293-289 (1976);
[4] U.S. patent application Ser. No. 828,190 filed Aug. 26, 1977 in the name of Gad Assaf now abandoned;
[5] "Floating Breakwater—State of the Art" by E. P. Richey and R. E. Nece, Proceedings of Floating Breakwater Conference, Newport, R.I., April, 1974.

BACKGROUND OF THE INVENTION

This invention relates to non-convective solar ponds and to a method for establishing the same.

A non-convective solar pond is one in which an artificial halocline is established and maintained by a mechanism described in references [1] and [4]. For reference purposes, a halocline is a zone in a body of salt water wherein a marked salinity gradient is present, the gradient being such that salinity increases with depth. As is well known, convection currents within a halocline are suppressed by the difference in vertical density. As a consequence, the presence of a halocline adjacent a surface of a body of water at a depth to which solar radiation penetrates i.e., 1-3 meters) is accompanied by heating of the halocline, and a layer therebeneath, to temperatures significantly higher than the surface temperature of the body of water. In the absence of the halocline, heat absorbed below the surface of the water would be transferred by convection currents to the surface of the water and dissipated by evaporation and longwave radiation. Thus, a stable halocline in a shallow pond converts the pond into a solar collector permitting temperatures as high as 100 degrees C. to be obtained at a depth of about 1 meter below the surface.

The practical ability of a shallow pond to act as a solar collector depnds upon the stability of the halocline. Factors tending to destabilize a pond are molecular diffusion of salt along the concentration gradient, mixing of the upper level of liquid due to wind action at the surface, and induced convection associated with heat extraction at the bottom of the pond.

The four references referred to above disclose various approaches to maintaining stratification and stabilizing the halocline. In reference [1], stratification is maintained by continuously flushing the surface of the solar pond with fresh water and adding salt at the bottom. Reference [2] maintains stratification by inducing a downward vertical motion across the halocline by flash evaporating liquid drawn from a heated layer of liquid below the halocline. Some of the concentrated solution obtained in the flash evaporation process is returned to the heated layer of liquid and fresh make-up is added at the surface to maintain the level of the pond.

Reference [3] maintains a stable halocline by inducing an upward vertical flow due to the injection of a concentrate below the halocline with a density greater than the density of liquid at the lower level of the halocline, the concentrate being formed by evaporating liquid drawn from the surface of the body of water.

Reference [4], in addition to dealing with a rising solar pond, also dicloses a standing solar pond in which a downward vertical flow is induced simultaneously with and equal to an upward vertical flow.

Large scale application of the principles for stabilizing a halocline in an overland pond is limited by environmental constraints such as contamination of fresh water supplies by the brines produced during operation. Furthermore, heating of the ground, as heat extracted from the solar radiation is stored over a long period of time, can initiate decomposition of organic materials in the ground causing degassing of the ground and producing bubbles which disrupt stratification. Where it is necessary to purchase and to transport salt to remote locations for constructing an overland pond, economic considerations render such ponds unattractive as a source for large scale power production.

In order to avoid inherent limitations of overland ponds for large scale power production, it has been suggested to utilize existing terminal lakes like the Dead Sea or the Great Salt Lake as solar lakes. References [3] and [4] describe techniques for constructing a rising or standing pond in a terminal lake. The advantage enjoyed by such lakes is that the only expense inolved in their operation is the construction and maintenance of floating windbreaks on the surface since the water and salt are already present. Thus, while ther are several salty basins in the world that fit the criteria for conversion into solar lakes, such basins are few in number and their location and size inhibit their conversion into solar lakes utilizing the techniques disclosed in the above references.

It is therefore an object of the present invention to provide a new and improved non-convective solar pond which has greater geographic applicability and availability as compared to existing or potential overland solar ponds.

SUMMARY OF THE INVENTION

In accordance with the present invention, a segregated solar pond is created in a region of a body of water by utilizing a vertical barrier which encloses the region for limiting horizontal transfer of water between the body and the region. Within such a region, a terminal lake can be simulated and a solar pond can be created by establishing a halocline and maintaining the same following the techniques described in References [3] and [4]. In the preferred form of the invention, the solar pond contains upper and lower levels of water separated by an impermeable barrier that prevents intermixing of the two the levels. The average density of the upper level exceeds the average density of the lower level. Floats on the periphery of the upper level buoyantly support the upper level on the surface of a larger body of water connected to the lower level. The upper level contains dissolved salts establishing a halocline that renders the upper level non-convective such that it is heated by its absorption of solar radiation. Such heat is transferred from the upper level to the lower level by conduction across the barrier, the heat being stored in the upper portion of the lower level. The lower portion of the lower level has a vertically extending thermocline and insulates the heated upper portion of this level from the cooler water in the body of water below the lower level.

Horizontal transfer of water between the body and the two levels is limited by a vertically extending barrier suspended in the body of water near the surface thereof. Preferably, the barrier floats in the body of water.

The floating vertical barrier is preferably anchored to the bottom of the body of water and windbreaks are provided on the surface of the upper level to minimize wind mixing in the solar pond. Optionally, the vertical barrier is constructed to minimize thermal conduction in the horizontal direction at least over the portion thereof where the water is hot.

The barrier segregating the upper level from the lower level is preferably in the form of a flexible sheet supported by a frame rigidly connected to floats that float in the upper level. The frame is in the form of a plurality of spaced-apart, parallel, elongated members, the sheet being fixed to the members. Optionally, transverse members are connected between the elongated members to define a grid having a predetermined modular size that minimizes tensile stress in the sheet due to the difference in density between the upper and lower levels.

The preferred manner of supporting the frame includes a plurality of elongated floats individually aligned with and rigidly connected to respective ones of the elongated members forming the frame. The floats are sized such that the plane of the water level, when the frame is substantially horizontal, substantially bisects a float into two equal volumes.

BRIEF DESCRIPTION OF THE DRAWINGS

Embodiments of the invention are shown in the accompanying drawings to which reference is now made:

FIG. 2 is a vertical section taken through the solar pond shown in FIG. 1;

FIG. 3 is a plot showing the variation in salinity in the upper level of the pond and the variation in temperature in the lower level as functions of depth;

FIG. 4 is a section similar to FIG. 2 but showing a different type of windbreak;

FIG. 5 is a partial plan view of an installation based on the solar pond shown in FIG. 1;

FIG. 6 is a cross-section similar to FIG. 2 but showing another embodiment of the vertical barrier for the solar pond;

DETAILED DESCRIPTION

Figure 1:
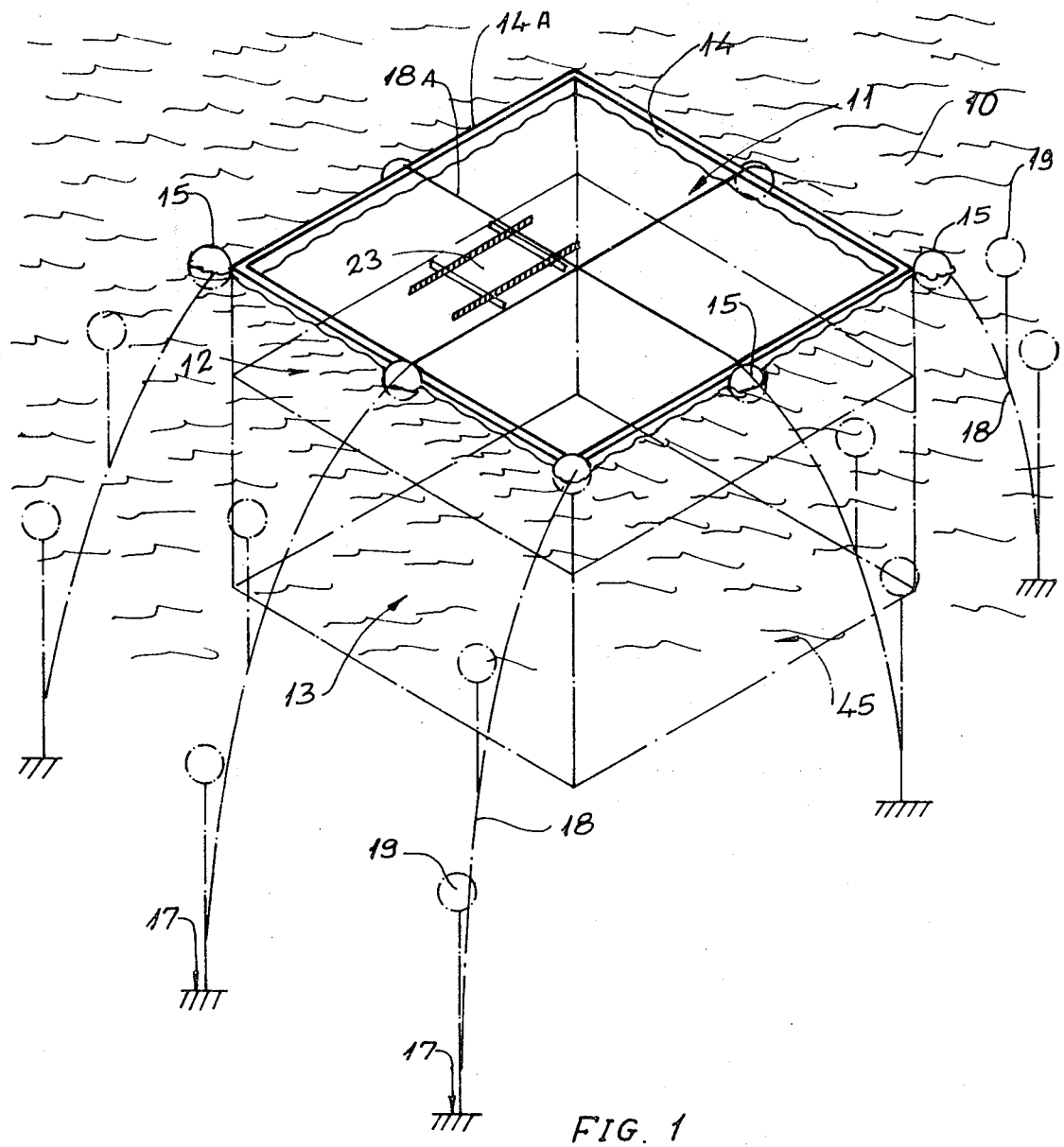
FIG. 1 is a perspective aerial view of a non-convective solar pond according to the present invention.

Referring now to FIG. 1, reference number 10 designates a body of water having a region 11 containing a solar pond according to the present invention, and a lower level 13 defined by vertically extending barrier 14 suspended in the body of water near the surface thereof, the barrier being in the form of a plurality of thin, impermeable, plastic sheets, such as polyethylene or the like, suspended from floats 15. The sheets constitute the vertical barrier and are arranged in a regular pattern (e.g., square) to form an enclosure that defines region 11, and limits horizontal transfer of water between the region within the barrier and the body of water outside the barrier.

In one aspect of the invention, region 11 can be introduced into a terminal lake such as the Dead Sea, by utilizing barrier 14 and by establishing and maintaining a halocline in the upper portion of the region using the known techniques described above. This approach is applicable to any very salty existing body of water. In such case, no horizontal barrier is needed to separate the halocline from the lower levels needed to separate the halocline from the lower levels of the region.

In the preferred form of the invention, region 11 contains an upper level 12 having a halocline defining a solar collector and a lower level 13 defining a heat storage volume. Horizontal barrier 20 limits vertical transfer of water and salt between the two levels. The lower level will have the same salinity as the rest of the body of water.

The free edge 14A of barrier 14 is shown as extending above the surface 16 of the body of water as shown in the drawing, but actually edge 14A is substantially level with the surface 16 of the body of water and some flushing of the surface of upper level 12 with sea water occurs. This is advantageous as it reduces the surface salinity of the water and replaces water evaporated from level 12. Consequently, the term "limits horizontal transfer of water" as applied to barrier 14 means that except for boundary effects at surface 12A of level 12 and the interface between lower level 13 and the water in body 10 therebeneath, the water in each level is substantially isolated from the water in body 10. The vertical barrier accordingly substantially prevents inter mixture of the fluid or water in the pond with the body of water. To permit the vertical barrier to float with changes in tide, the barrier may be anchored to the bottom 17 with flexible cable 18 interposed between underwater floats 19.

The ends of flexible cables 18 opposite the ends fixed at 17 pass through or are secured to floats 15, and then pass from one end of the pond to the other, as shown by portions 18A, to constrain the vertical barrier in a selected shape. Portions 18A also provide a means for attaching and constraining floating windbreak 23. The number and distribution of floats 15 and portions 18A extending across the pond are determined by the size and shape of the pond. As will be discussed in greater detail hereinbelow, floats 15 can be generally spherical as illustrated in FIGS. 1 and 2, or can have a larger surface in contact with the body of water, as illustrated by cylindrical float 50 in FIG. 7.

Horizontally extending barrier 20, coextensive with region 11, is attached at its periphery to vertical barrier 14 about 1-3 meters below the free edge 14A of the barrier, and operates to limit the vertical transfer of water between upper level 12 and lower level 13. The water in level 12 is thus separate from the water in level 13 and substantially separate from the water in body 10. As a consequence, when halocline 21 (FIG. 2) is established, level 12 constitutes a floating solar collector.

Halocline 21 can be established in level 12 in any of a number of known ways, the basic idea being to provide a salt concentration that increases with depth as shown by curve 22 in FIG. 3. The halocline begins just below the surface 12A of level 12 and ends just above barrier 20, the exact depth of the lower end of the halocline being variable and depending upon the size of the solar lake, the amount of heat to be collected and its rate of extraction. Generally speaking, the halocline will be approximately 1-2 meters while the wind-mixed layer 24 above the halocline will be from 0.1-0.5 meters depending upon the efficiency of windbreaks 23 which float on surface 12A. Such windbreaks may take the form disclosed in references [4] and [5]. As is well known, the shallower the depth of the wind-mixed layer adjacent surface 12A, the more efficient will be the pond as a solar collector. As indicated in FIG. 3, wind-mixed layer 24 has a uniform and relatively low salt concentration as indicated by curve 22 in the portion adjacent the zero depth point. Layer 24 will be continuously flushed by sea water from body 10, such sea water being relatively fresher than water in the halocline and replacing evaporation losses in level 12 and maintaining a substantially constant elevation at surface 12A.

Depending upon the depth of the halocline and the transparency of the water, the temperature in level 12 below the halocline will range from 80-100 degrees C. When the halocline is less than 1-2 meters, lower operational temperatures will result. Convective layer 25 below halocline 21 is adjusted in accordance with the requirements for heat extraction. When heat is extracted from convective layer 25, the depth of this layer should be large enough to enable the necessary circulation associated with the heat extraction to occur. It can be shown that when the inlet and outlet ports associated with an external heat exchanger are along one side of a pond in the convective layer, a relationship exists between the depth of this layer and the length of the pond in relation to the temperature difference between the inlet and outlet. For example, if a 5 degree C. temperature differential exists, a solar pond located in low latitudes will require convective layer 25 to be no smaller than about 10 cm. for a pond that is 100 m. long; for a 1 km. pond, the depth should be no smaller than 30 cm; and for a 10 km. pond, the convective layer should be no smaller than 1 m. deep.

The actual depth of the convective layer 25 is not critical in terms of operation and can be decided depending upon the amount of heat which is to be stored in the convective layer. However, the larger the convective layer, the greater the amount of concentrated sea water necessary with the result that the stratification process to establish the halocline will take a longer period of time.

Below horizontal barrier 20 is convective heat storage zone 26 in the lower level 13. The curve 27 of FIG. 3 shows the temperature variation with depth in zone 26 and the temperature is substantially constant. Again, the thickness of this zone will depend upon many factors including the rate at which heat is extracted from this zone. Below the heat storage zone 26 the water in layer 13 will exhibit a linear temperature gradient as indicated at 28 until the temperature below the layer 13 is reached. When the pond is located in a region of strong current, an additional horizontal barrier 45 may be provided below the thermocline. Barrier 45 may be near the lower edge of the vertical barrier.

When heat extracted from zone 26 by conducting water therefrom into a power plant and discharging cooler water from the plant into the layer 13 at the bottom of the heat storage zone, the depth of the zone will be determined by the discharge depth. To obtain seasonal storage, the heat storage zone should be about 5 meters deep in temperate zones. Thermocline 28 serves to insulate heat storage zone 26 from the cooler water therebelow. The amount of heat lost to such cooler water is usually a design parameter of the pond; this will determine the depth of the thermocline needed. To protect the thermocline, the lower edge 14B of vertical barrier 14 should extend to the depth of the thermocline.

It can be shown that the depth of the thermocline is related to the difference in temperature between the heat storage zone 26 and the ambient temperature of the water below level 13. If it is desired to reduce the heat loss from the heat storage zone to the bottom of the body of water to about 10% of the useable heat, which is about 60 watts/m2, and if the temperature difference is about 60 degrees C., the thermocline should be about 6 m. deep. Deeper thermoclines will protect the pond more efficiently. For example, a 12 m. thermocline will reduce the heat loss to about 5%. As in the case of the convective layer 25, the provision of a deeper thermocline will be expensive because it requires longer vertical barriers 14.

Another way to reduce the heat lost from the heat storage zone 26 is to introduce upwelling into the lower level 13. This can be done by following the procedure set forth in reference [4]. The introduction of upwelling in the lower level 13 of the pond will change the thermal gradient therein from a linear one to an exponential one.

After the halocline has been established in upper level 12 and a floating windbreak or other expedient is utilized for the purpose of minimizing the thickness of wind-mixed layer 24, solar radiation incident on surface 12A absorbed in the upper layer will cause the temperature of water in the layer to rise. Eventually, the temperature in the convective layer 25 below the halocline will become very hot and will approach the boiling point. Heat from this layer will be transferred across barrier 20 into heat storage zone 26, and eventually the size of this zone will build up to the desired value. Heat contained in convective layer 25 or the heat storage zone 26 can be extracted by actually tapping water from these layers and passing it through an external heat exchanger and then returning the cooled water to the layer from which it was taken. As shown in FIG. 2, heated water is drawn by conduit 30 into heat exchanger 31 located on land or on a fixed tower, or on a floating structure where a separate, counterflowing heat absorbing medium such as an organic fluid absorbs the heat from the water and is vaporized thereby, and the cooled water is returned by conduit 32 to a point just above the lower edge of the heat storage zone. Vaporized fluid from the heat exchanger passes into a heat engine, such as turbine 33, the spent fluid being condensed by cooler water from body 10. Turbine 33 drives electrical generator 34. Alternatively, heat can be extracted from the heat storage zone below the horizontal barrier 20 by a heat exchanger, and the heat so extracted can be utilized in a converter for the production of useful energy such as electricity.

In order to reduce the heat loss from the halocline and convective layer of upper level 12 and the heat storage zone 26 of the lower level 13, it is possible to follow the procedure shown in FIG. 6 wherein the vertical barrier is constructed of a hollow membrane such as indicated by reference numeral 40, the membrane containing inclined baffles 42. The interior of the membrane may be filled with water or may be filled with air. By reason of its construction, the membrane acts as a thermal insulator reducing the amount of heat transferred from the heated water in the solar pond to the cooler body of water 10. Preferably, the membrane 40 will extend deep enough to include all or part of the heat storage zone 26. A skirt 43 depending from the membrane completes the vertical barrier.

In a further embodiment, where the cross-section of region 11 is large, sagging of the central portion of horizontal barrier 20 can be reduced by positioning floats beneath horizontal barrier 20. In a further alternative arrangement, the floating windbreaks can be attached to the horizontal barrier 20A as shown in FIG. 4 for the purpose of supporting the barrier.

The most favorable location for a solar pond according to the present invention will be along the continental shelves. Floating wave breaks could protect the area from sea waves while the vertical barriers can be anchored by means of towers reaching to the ocean floor as indicated in FIG. 5. The towers can also be used as supports for power stations and would be connected by means of pipes to the heat storage zone of the solar pond. Instead of fixed towers, it may also be possible to utilize floating arrangements in which the vertical barriers are unattached to the ocean bottom.

The tensile strength of the material of barrier 20 segregating the pond from the body of water and the stability of the segregated pond itself in the body of water are factors that should be taken into account in large-scale ponds. Both these factors arise from the nature of the segregated pond wherein the upper level of water has an average density that exceeds the average density of the water in the level beneath. Floats 15, providing stabilizing means connected to barrier 20, support the barrier and enable the segregated solar pond to be buoyantly supported on and segregated from a larger body of water. This arrangement results in a tensile stress in the barrier which is a function of the square of the distance between the supports for the barrier. Quantitatively, the tensile stress T in a flexible sheet constituting barrier 20 is given as follows:

(1) $T = g(\Delta\rho)(L^2/2) \cos\theta$

Where $\theta$ = the average inclination of the sheet with respect to the horizontal, $\Delta\rho$ = the density difference between the upper and lower levels in the pond, g is the gravitational constant, and L is the spacing between supports. Assuming the sheet is substantially horizontal and the density difference between the two levels of water is approximately 200 kg/m$^3$, the tensile stress in the lamina is: $T = 1000L^2$.

When L is 10 m, the tensile strength is 100,000 Newtons/m. For a sheet thickness of approximately 1 mm, the stress will be approximately 14,700 psi which is above the tensile strength for inexpensive conventional sheet materials such as polyethylene or the like. In order to utilize such inexpensive material, the sheet material sould be supported by frames defining a grid of size approximately 3 m×3 m.

As indicated above, the stability of the segregated pond must also be taken into account in large-scale projects where a considerable amount of wave movement and wind pressure will be present in the body of water in which the segregated pond floats. Any perturbation in the segregated pond with respect to the horizontal will result in a shift in the center mass of the upper level which could, depending on the circumstances, result in a tipping or overturning of the upper level (i.e., sinking) into the larger body of water in which the upper level floats. In order to preclude this situation, stabilizing means in addition to floats 15 can be utilized. Such stabilizing means would exert a force on the barrier that would counter any force tending to tilt the segregated layer.

Figure 8:
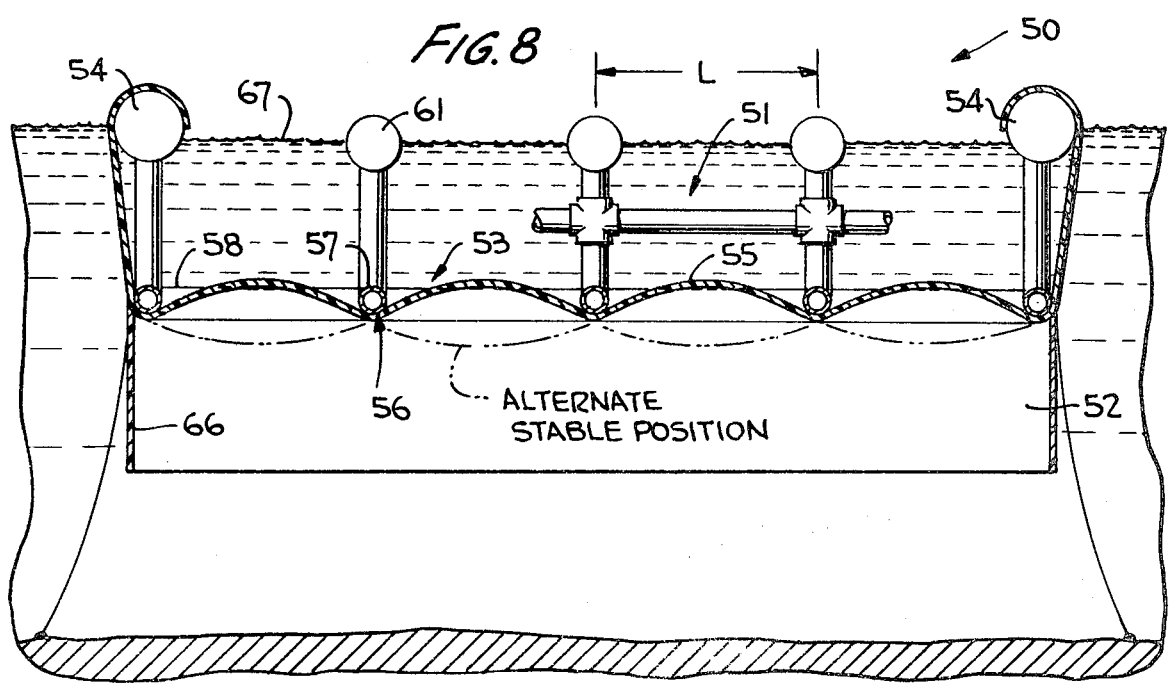
FIG. 8 is a cross-sectional view taken along line 8—8 of FIG. 7 illustrating the solar pond assembly in anchored condition.

The principles described above are incorporated into the present invention in the manner shown in FIGS. 8-11 to which reference is now made. As shown in FIG. 8, segregated solar pond 50 comprises an upper level of water 51 overlying a lower level of water 52, the average density of the upper level exceeding the average density of the water in the lower level. This situation arises when upper level 51 contains a halocline and the segregated pond floats in a body of fresher water. A similar situation exists where the upper level is of uniform density and constitutes a floating evaporation pond.

Barrier 53 segregating the upper and lower levels for preventing intermixing of the fluids contained in the two levels is connected to stabilizing means in the form of floats 54 at the periphery of the segregated pond. As indicated in FIG. 8, the water level outside the segregated pond is slightly higher than the water level inside the pond by reason of the difference in density between the water outside the pond and the water inside the pond.

Figure 7:
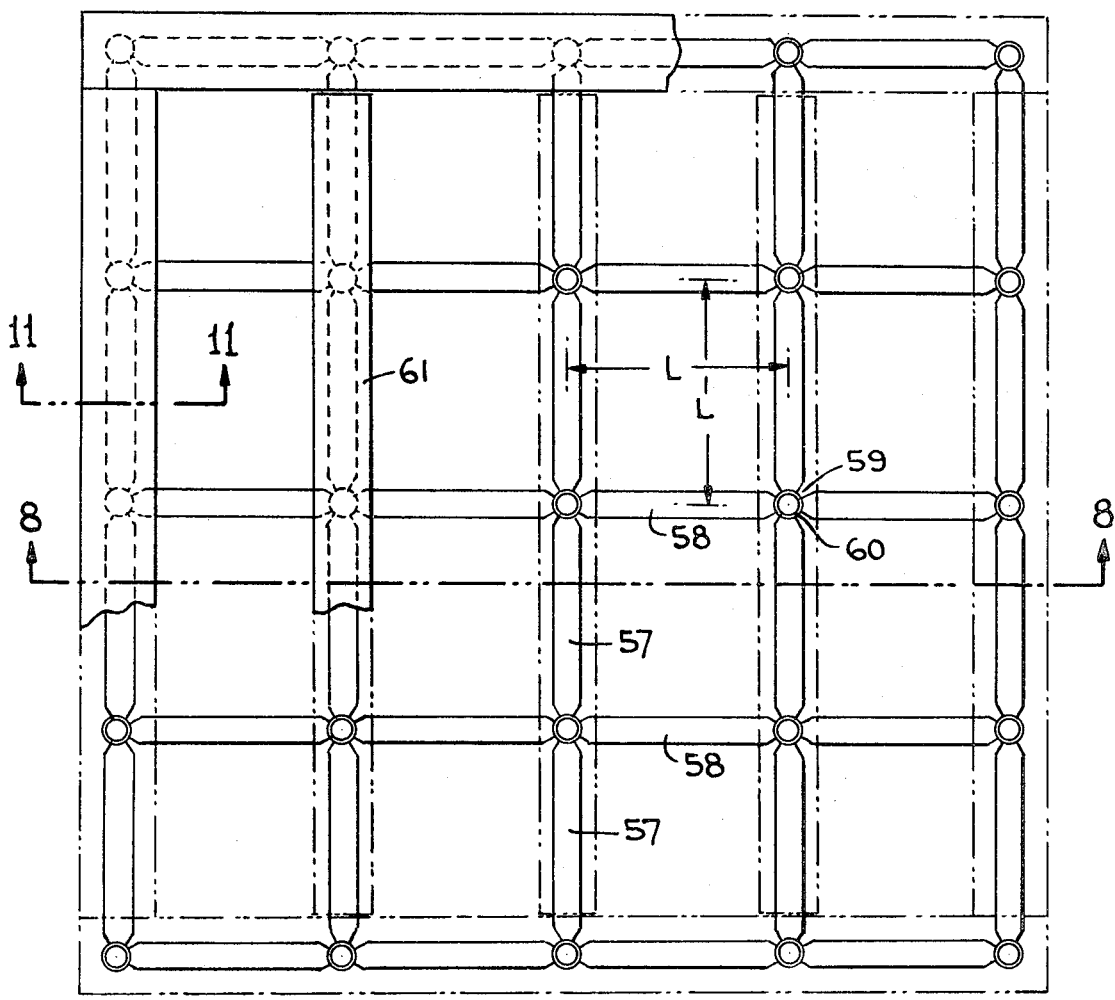
FIG. 7 is a schematic aerial view of a framework assembly according to the present invention.
Figure 9:
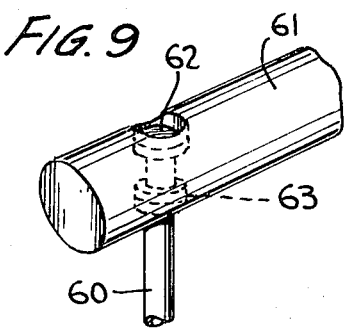
FIG. 9 is a perspective view of a portion of the framework assembly of the solar pond.

Barrier 53 comprises flexible xheet 55 operatively associated with frame 56 which is in the form of a plurality of spaced-apart, parallel elongated members 57 which may be PVC pipes or the like. Transverse members 58 may also be connected to members 57 for the purpose of providing a grid having a predetermined modular arrangement as indicated in FIG. 7. The preferred way to construct frame 56 is indicated in FIG. 9 wherein the longitudinal and transverse members are connected at their intersections by fittings 59 by a bonding operation or by threads.

Having formed a grid structure from the PVC pipes and the fittings in the manner indicated in FIG. 7, vertical tubes 60 inserted in the fittings provide a means for rigidly connecting the frame to the stabilizing means which are in the form of floats 54 and 61 (FIG. 8). Vertical members 60 are rigidly connected to the floats in the manner illustrated in FIGS. 9 and 11. Specifically, member 60 passes through a vertical aperture in a float, relative movement between the member and the float being precluded by collars 62, 63 rigidly attached to member 60 but spaced from each other near the free end of member 60. These collars fit in counterbored recesses 64 in the floats.

Figure 10:
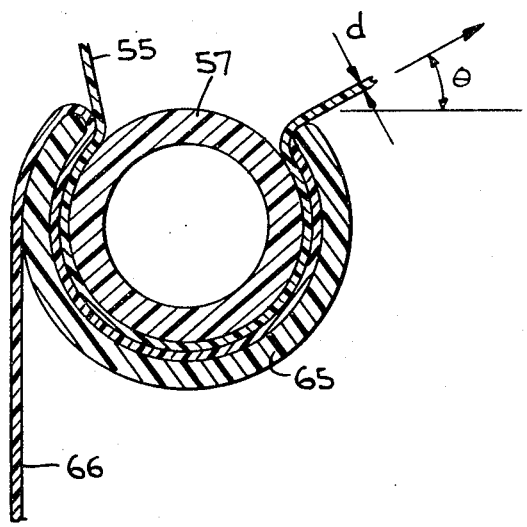
FIG. 10 is an enlarged cross-sectional view of the connection between the barrier sheet and the framework assembly.
Figure 11:
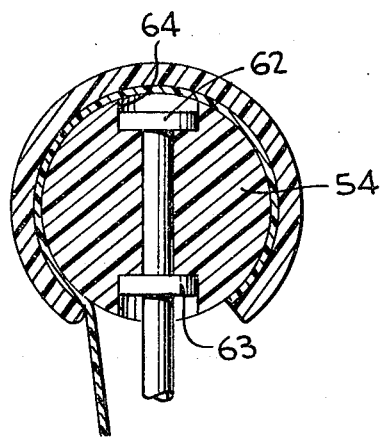
FIG. 11 is a cross-sectional view taken along line 11—11 of FIG. 7.

The connection between sheet 55 and frame 56 is shown in detail in FIG. 10. Spefically, the connection is achieved by utilizing a spring clip 65 which may be in the form of a section of pipe like that shown at 57 but longitudinally split and then spread apart before being snapped over the outside of member 57 as shown in FIG. 10. Before the clip 65 is snapped in place, sheet 55 is wrapped around member 57. Clips 65 may be relatively short and spaced at uniform intervals along member 57.

In order to provide a vertical curtain below the segregated pond and to prevent the escape of water heated by conduction across sheet 55, clip 65 can be utilized as indicated in FIG. 10. Specifically, the vertical curtain in the form of sheet 66 can be passed around the lower surface of member 57 at the periphery of the segregated pond, overlying the sheet 55, and then clip 65 can be snapped into place.

As shown in FIG. 7, each of the members 57 (which are vertically disposed in FIG. 7) is aligned with an elongated float 61 which is rigidly connected, via vertical members 60, to the elongated member. Floats 61 are sized such that the plane of the water level, as shown in FIG. 8, when the frame is substantially horizontal, substantially bisects the float into two equal volumns. As can be seen in FIG. 8, floats 61 float in the upper level and support the frame intermediate the support provided by floats 54 which are located at the periphery of the segregated pond. Furthermore, floats 61 provide longitudinal passageways 67 which define channels that permit a boat to travel from one end of the pond to the other for the purpose of inspecting and repairing the sheet material within the channel.

In order to effect a fluid connection between the various channels, floats 61 may be discontinuous instead of continuous as shown in FIG. 7, or fluid connections may be provided through the float from side to side for the purpose of connecting the water in one channel to the water in the other channel.

With the arrangement shown in FIG. 8, that is, with stabilizing means for the pond provided at the periphery as well as intermediate the periphery, any disturbance of the segregated pond will be resisted by the buoyant effect of floats 54 and 61. That is to say, any disturbance in which one end of the upper level may sink lower than the other end, and which would result in the flow of dense water towards the end that has sunk, will cause the floats associated with this end of the pond to sink in the water. The buoyancy created by this will resist the sinking motion of the pond, thereby providing a force countering the sinking and restoring the pond to its normal condition.

While the segregated ponds described above are disclosed for use in a large body of water, the concept of providing a two-level segregated pond in which the upper level has an average density that exceeds the density of the water in the lower level, is applicable to ponds constructed in the ground. That is to say, one could excavate a region, fill it partially with relatively fresh water, and overlay the water with a barrier over which a more dense layer could be located. In this manner, a considerable reduction in the amount of salt is achieved when building an over-land, large-scale solar pond utilizing a halocline. In such case, the barrier would be anchored at the periphery of the excavation while the center portion of the barrier would be supported by the arrangement described above, namely, a frame and floats supporting the frame.

While the present disclosure deals almost exclusively with the construction of a non-convective segregated solar pond for the purpose of heating relatively fresh water in a heat storage layer beneath the non-convective and segregated upper layer, the principles of the present invention are also applicable to the construction of an evaporating pond. That is to say, the segregated upper layer can be convective, evaporation can be carried out by floating the segregated pond in a fresher body of water. For example, seawater can be evaporated by building a segregated pond in the sea. Such a floating evaporating pond could provide relatively dense water that could be utilized for stabilizing the halocline in another floating pond. Alternatively, a floating evaporating pond could be used to provide concentrated brines for chemical purposes.

In addition to reducing the amount of salt needed to construct a solar pond of the type described above, the segregated solar pond of the present invention has the advantage of permitting diagnostic procedures to be carried out to detect leaks in the barrier. A tear in the sheet forming the barrier will result in the downward flow through the tear of relatively dense salty water from the upper layer which will enter the less dense water in the lower layer. The existence of such a density anomaly in the lower level will be detectable using ultrasonic transponders located at various places along the periphery of the pond and beamed into the lower level just below the barrier. A stream of dense water flowing through a tear in the barrier will provide a target for the ultrasonic energy and reflect back to the transponder an echo that will provide range information on the tear. By providing a plurality of transponders, the location of the tear can be determined by triangulation. Having thus ascertained the location, a boat can be dispatched within the channel above the location, and a patch can be installed on the tear.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. A method for establishing a solar pond in a body of water comprising the steps of:
   (a) establishing a collector containing water in the body of water such that the water in the collector is segregated from and does not mix with the water in the body of water but is in heat exchange relationship therewith;
   (b) establishing an artificial halocline in the collector for absorbing heat which is transferred to a heat storage volume of water in the body of water below the collector, the average density of the water in the collector exceeding the average density of water in the heat storage volume; and
   (c) inhibiting mixing of the water in said heat storage volume with other water in the body by establishing a vertical barrier between the heat storage volume and the body of water and establishing a horizontal barrier between the halocline and the heat storage layer.

2. A method according to claim 1 including the step of minimizing lateral transfer of heat in the water in said heat storage volume to other water in the body.

3. In combination:
   (a) a body of water having a region containing an upper lever of water defining a solar collector, and a lower level of water defining a heat storage volume;
   (b) means for preventing horizontal transfer of water between the body and the region;
   (c) means for preventing vertical transfer of water between the two levels; and
   (d) means for rendering the upper level non-convective said last named means being a halocline.

4. The combination according to claim 3 wherein the means for rendering the upper level non-convective is a halocline whose position is maintained near the surface by constructing the upper level as any one of the following: a rising, falling or standing solar pond.

5. The combination according to either of claims 3 or 4 wherein the means for preventing horizontal transfer of water between the body and the region is a vertically extending barrier suspended in the body of water near the surface thereof surrounding and defining said region.

6. A combination according to claim 5 wherein the vertical barrier floats in the body of water.

7. The combination of claim 6 including anchoring means for anchoring the floating vertical barrier to the bottom of the body of water.

8. The combination of claim 7 wherein sub-surface floats are employed on anchoring means to tension the floating barrier against tidal and wave action.

9. The combination according to claim 5 wherein the means for preventing vertical transfer of water between the levels is a horizontally extending barrier co-extensive with said region attached to the vertically extending barrier.

10. The combination of claim 9 wherein the vertical barrier extends below the horizontal barrier and establishes the heat storage volume.

11. The combination of claim 9 including floats below the horizontally extending barrier intermediate its connection to the vertically extending barrier for maintaining the horizontal barrier substantially level.

12. The combination of claim 10 wherein the vertical barrier extends below the horizontal barrier more than three meters.

13. The combination of claim 12 wherein the vertical barrier is non-conductive at least over the upper portion defining the upper level.

14. The combination of claim 12 wherein the vertical barrier is non-conducting at least over the portion thereof defining the heat storage volume.

15. The combination of claim 4 wherein windbreaks are provided on the surface of the upper level.

16. The combination according to claim 3 wherein the elevation of the surface of water in the upper level is lower than the elevation of the surface of the body of water.

17. The combination of claim 3 wherein the upper level absorbs heat from solar radiation.

18. A solar power plant comprising:
(a) a solar pond located in a body of water including means segregating the body of water into upper and lower levels for preventing intermixing of the levels; and means segregating the lower level from the remainder of the body of water for inhibiting intermixing of the water in the lower level with the remainder of the body of water;
(b) a halocline establishing a non-convective condition in the upper level;
(c) means for effecting transfer of heat from the upper to the lower level; and
(d) converter means for effecting transfer of heat in the lower level to mechanical energy.

19. A method for establishing a solar pond in a body of water comprising the steps of:
(a) enclosing a region of the body with a vertical barrier for limiting the horizontal transfer of water between the body and the region, the barrier extending vertically from a location adjacent the surface to a depth greater than about 1 m.;
(b) establishing a halocline in the upper portion of the region adjacent the surface; and
(c) preventing the vertical transfer of water between the upper portion of the region containing the halocline and the lower portion of the region below the halocline.

20. The method of claim 19 wherein the vertical barrier floats in the body of water.

21. The method of claim 19 wherein the vertical barrier, at least in the region of the halocline, is such as to inhibit heat transfer from the region of the halocline into the surrounding body of water.

22. A segregated solar pond comprising:
(a) an upper, non-convective level of water comprising a halocline overlying a lower level of water, the average density of the water in the upper level exceeding the average density of the water in the lower level; and
(b) a barrier segregating the upper and lower levels for preventing intermixing of fluids contained in the two levels.

23. A segregated solar pond according to claim 22 including stabilizing means connected to the barrier for supporting the same.

24. A segregated solar pond according to claim 23 wherein the barrier includes a flexible sheet supported by a frame rigidly connected to the stabilizing means.

25. A segregated solar pond according to claim 24 wherein the upper level has a periphery, and wherein the stabilizing means includes floats on the periphery for buoyantly supporting the upper level on the surface of a larger body of water.

26. A segregated solar pond according to claim 25 wherein the upper level of water contains a halocline that renders the upper level non-convective such that heat absorbed by solar radiation in the upper level is transferred to the lower level by conduction across the barrier.

27. A segregated solar pond according to claim 26 including means for inhibiting mixing of water in the lower level with the water in the body of water.

28. A segregated solar pond according to claim 25 wherein the stabilizing means includes floats rigidly connected to the frame and floating in the upper level.

29. A segregated solar pond in accordance with claim 28 wherein the frame is in the form of a plurality of spaced-apart, parallel elongated members.

30. A segregated solar pond according to claim 29 including transverse members between the elongated members.

31. A segregated solar pond according to claim 30 wherein the sheet is fixed to the members.

32. A segregated solar pond according to claim 31 wherein the floats are in the form of a plurality of elongated cylinders individually aligned with and rigidly connected to respective ones of the members.

33. A segregated solar pond according to claim 32 wherein the floats are sized such that the plane of the water level, when the frame is substantially horizontal, substantially bisects the float into two equal volumes.

34. A segregated solar pond according to claim 24 wherein the stabilizing means includes floats rigidly connected to the frame and floating in the upper level.

35. A segregated solar pond according to claim 34 wherein the frame is in the form of a plurality of spaced-apart, parallel elongated members.

36. A segregated solar pond according to claim 35 wherein the sheet is fixed to the members.

37. A segregated solar pond according to claim 36 wherein the floats are elongated and individually aligned with and rigidly connected to respective ones of the members.

38. A segregated solar pond according to claim 37 wherein the frame includes transverse members attached to and extending between the elongated members.

39. A segregated solar pond according to claim 38 wherein the transverse and elongated members of the frame define a lattice-like grid whose modular length is about 3 m.

40. A segregated solar pond according to claim 22 wherein the barrier comprises:
    (a) a flexible sheet impermeable to water; and
    (b) a frame for supporting the sheet.

41. A segregated solar pond according to claim 40 including floatation means floating in the upper level and rigidly connected to the frame for supporting the same.

42. A method for establishing a solar pond having a periphery in a body of water comprising preparing a non-convective layer of water that receives solar radiation, the average density of the non-convective layer exceeding the average density of the body of water establishing a vertical barrier along the periphery; establishing a horizontal barrier, in the body of water, extending to the vertical barrier; and floating said non-convective layer on the horizontal barrier such as to prevent intermixing of the non-convective layer with water in the body of water.

43. A method according to claim 42 wherein the floating layer contains an artificial halocline.

* * * * *

UNITED STATES PATENT AND TRADEMARK OFFICE
CERTIFICATE OF CORRECTION

PATENT NO. : 4,475,535

DATED : October 9, 1984

INVENTOR(S) : Gad ASSAF

It is certified that error appears in the above-identified patent and that said Letters Patent is hereby corrected as shown below:

Col. 1, line 3 (after the caption "SEGREGATED SOLAR POND") insert:
---This application is a continuation-in-part of copending application Ser. No. 889,862 filed March 24, 1978 (now abandoned).---

Signed and Sealed this

Eighth Day of November, 1988

Attest:

DONALD J. QUIGG

*Attesting Officer*   *Commissioner of Patents and Trademarks*